(12) United States Patent  
Sedlacek et al.

(10) Patent No.: US 9,124,597 B2  
(45) Date of Patent: Sep. 1, 2015

(54) METHOD AND NODE IN A TELECOMMUNICATIONS NETWORK

(75) Inventors: Ivo Sedlacek, Landskrona (SE); Martien Huijsmans, Oisterwijk (NL); Gert Öster, Järfälla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 231 days.

(21) Appl. No.: 13/496,179

(22) PCT Filed: Dec. 18, 2009

(86) PCT No.: PCT/EP2009/067562  
§ 371 (c)(1),  
(2), (4) Date: Jun. 14, 2012

(87) PCT Pub. No.: WO2011/032611  
PCT Pub. Date: Mar. 24, 2011

(65) Prior Publication Data  
US 2012/0246697 A1  Sep. 27, 2012

Related U.S. Application Data

(60) Provisional application No. 61/243,344, filed on Sep. 17, 2009.

(51) Int. Cl.  
*H04L 29/06* (2006.01)  
*H04W 12/08* (2009.01)

(52) U.S. Cl.  
CPC ............ *H04L 63/102* (2013.01); *H04L 65/105* (2013.01); *H04L 65/1006* (2013.01);  
(Continued)

(58) Field of Classification Search  
CPC ... H04L 63/20; H04L 65/1006; H04L 65/105; H04L 2209/76; H04W 12/06; H04W 76/02; H04W 76/022; H04W 12/08  
See application file for complete search history.

(56) References Cited

U.S. PATENT DOCUMENTS 8,315,247 B2 * 11/2012 Rosenberg ............... 370/352  
8,442,526 B1 * 5/2013 Bertz et al. ............. 455/435.1  
(Continued)

FOREIGN PATENT DOCUMENTS

WO  WO2008141675 A1  11/2008  
WO  WO2009049685 A1  4/2009

OTHER PUBLICATIONS

3rd Generation Partnership Project. "IP multimedia call control protocol based on Session Initiation Protocol (SIP) and Session Description Protocol (SDP)"; Stage 3; (Release 8). 3GPP TS 24.229 V8.8.0, Jul. 2009. Technical specification, ETSI, Sophia-Antipolis, France.

(Continued)

*Primary Examiner* — Michael R Vaughan  
(74) *Attorney, Agent, or Firm* — David E. Bennett, PLLC

(57) ABSTRACT

During a registration procedure by a User Equipment (UE) via a Proxy Call Session Control Function (P-CSCF) node and a Serving Call Session Control Function (S-CSCF) node, the S-CSCF node provides a policy indicator in a response message to a register request message. The policy indicator enables subsequent operation of the node to be controlled according to whether or not a registered UE has an associated policy. As such, delays (such as delays associated with retrieving an associated policy) are only experienced by UEs that have previously been determined as having such an associated policy, rather than all UEs being affected in the same way.

7 Claims, 6 Drawing Sheets

(52) U.S. Cl.
CPC ........ *H04L65/1016* (2013.01); *H04L 65/1063* (2013.01); *H04L 65/1069* (2013.01); *H04W 12/08* (2013.01)

(56) References Cited

U.S. PATENT DOCUMENTS

| | | | | |
|---|---|---|---|---|
| 2006/0294244 | A1* | 12/2006 | Naqvi et al. | 709/227 |
| 2008/0071896 | A1* | 3/2008 | Cohen et al. | 709/223 |
| 2009/0210478 | A1* | 8/2009 | Bakker et al. | 709/202 |
| 2009/0210538 | A1* | 8/2009 | Allen et al. | 709/227 |
| 2009/0268723 | A1* | 10/2009 | Przybysz | 370/352 |
| 2009/0296688 | A1* | 12/2009 | Bakker et al. | 370/352 |
| 2010/0146130 | A1* | 6/2010 | Montemurro et al. | 709/228 |
| 2010/0154030 | A1* | 6/2010 | Montemurro et al. | 726/1 |
| 2010/0154031 | A1* | 6/2010 | Montemurro et al. | 726/1 |
| 2010/0165833 | A1* | 7/2010 | Du et al. | 370/217 |
| 2010/0185741 | A1* | 7/2010 | Lee et al. | 709/206 |
| 2010/0223348 | A1* | 9/2010 | Przybysz et al. | 709/206 |
| 2012/0042085 | A1* | 2/2012 | Boeszoermenyi et al. | 709/228 |
| 2012/0331158 | A1* | 12/2012 | Bakker | 709/227 |
| 2012/0331163 | A1* | 12/2012 | Bakker | 709/229 |
| 2013/0308634 | A1* | 11/2013 | Naqvi | 370/354 |

OTHER PUBLICATIONS

Van Elburg, J., Drage, K., "The Session Initiation Protocol (SIP) P-Private-Network-Indication Private-Header ((P-Header)" Internet Draft, Ericsson Telecomunicatie B.V. & Alcatel-Lucent. Jul. 6, 2009.

Drage, K., "A SIP/SIPS URI parameter for passing subscription data." Internet Draft, Alcatel-Lucent. Apr. 19, 2009.

Hilt, V. & Rosenberg, J. "Supporting Intermediary Session Policies in SIP." Internet Draft, Bell Labs/Lucent Technologies, dynamicsoft. Sep. 29, 2003.

Chatras, B., "Business communications standardization in ETSI." IEEE Wireless Communications, vol. 16, No. 3. Jun. 1, 2009. IEEE, Piscataway, NJ.

3rd Generation Partnership Project. "Use of Subscription Data SIP/SIPS URI parameter." 3GPP TSG CT WG1 Meeting #58. Sophia Antipolis, France. Apr. 20-24, 2009.

* cited by examiner

METHOD AND NODE IN A TELECOMMUNICATIONS NETWORK

TECHNICAL FIELD

The invention relates to a method and node in a telecommunications network, and in particular to a method and node of a telecommunications network capable of supporting features such as Next Generation Corporate Networks (NGCNs).

BACKGROUND

The IP Multimedia Subsystem (IMS) is an architectural framework for delivering Internet Protocol (IP) multimedia services. It constitutes an approach to providing internet based multimedia services, including voice calls and messaging, to various wireless telecommunications networks, such as Global System for Mobile Communications (GSM), wireless LAN, and Universal Mobile Telecommunications System (UMTS), as well as fixed line networks. One of the protocols used in the IMS network is the Session Initiation Protocol (SIP). A terminal attached to the IMS network is referred to as User Equipment (UE).

SIP messages in the IMS are processed using a collection of servers or proxies, collectively known as Call Session Control Function (CSCF).

FIG. 1 shows some of the basic components of an IMS network. A CSCF 10 is provided in a session layer (also known as the IMS layer or signalling plane) of the architectural framework. A central node of this session layer is a Serving-CSCF (S-CSCF) 12. The S-CSCF 12 performs session control, and interfaces with a Home Subscriber Server (HSS) 14 located in a service/application layer. The S-CSCF 12 may interface with the HSS 14 for, amongst other things, downloading user profiles or subscription information, or performing authentication procedures. The S-CSCF 12 is also responsible for handling SIP registrations, which allows it to bind a user's location (for example an IP address of a UE 20) and the SIP address. The S-CSCF 12 also decides to which application server(s) 16 a SIP message will be routed, in order to provide their respective services. The application servers 16 in the application layer provide services that have some relevance to the communication session established in the session layer. These include applications that can enhance communication capabilities in some way, for example advanced conferencing facilities of a call session being controlled by the session layer.

The CSCF 10 also comprises a Proxy-CSCF (P-CSCF) 18, which is the first point of contact for a UE 20. As will be appreciated by a person skilled in the art, the transport layer provides basic IP connectivity between physical items of equipment (i.e. UEs and P-CSCF or P-CSCF and S-CSCF), including connectivity to the outside world such as the public Internet.

A P-CSCF 18 is discovered by a UE 20 prior to registration, and does not change for the duration of the registration. The P-CSCF 18 contacts the S-CSCF 12 to authenticate a UE 20, and other nodes trust the P-CSCF 18 such that they do not have to authenticate the user again. The P-CSCF 18 may also include a Policy Decision Function (PDF), which is used for operations such as policy control and bandwidth management. The PDF can also be a separate function provided elsewhere in the framework.

The CSCF 10 also comprises an Interrogating-CSCF (I-CSCF) 22. The domain name and IP address of the I-CSCF 22 are published in a Domain Name System (DNS), so that remote servers can find the I-CSCF 22, and use the I-CSCF 22 as a forwarding point (for example during registration) for SIP messages to this domain. The I-CSCF 22 queries the HSS 14 using what is known as the Diameter Cx interface, for example to retrieve user location, and routes SIP requests to their respective assigned S-CSCFs.

Nowadays, many enterprises and other organisations require their own telecommunications capabilities to support their own internal communications as well as supporting communications with the outside world. This avoids incurring unnecessary charges and provides added value in terms of services and features available, integration with other enterprise applications, and so forth. These capabilities are provided through enterprise telecommunication networks (also known as corporate telecommunication networks, CN, or simply enterprise networks).

Release 8 of the $3^{rd}$ Generation Partnership Project (3GPP), Technical Specification 24.229 provides support for so-called Next Generation Corporate Networks 24 (NGCN), also known as Private Branch Exchange (PBX) or enterprise networks. An NGCN is a self-contained corporate network designed to take advantage of emerging IP-based communications solutions, and can have their own applications and service provisioning.

At present the following methods exist by which an NGCN 24 can be connected to the 3GPP IMS network:
the NGCN 24 can act as a regular UE 20;
the NGCN 24 can act as a UE 20 with additional privileges, the so called "privileged sender"

The latter method provides the NGCN 24 with more power, since the NGCN 24 is allowed to originate call sessions with originating identity not restricted to the registered identities.

A P-CSCF 18 has responsibility for controlling if the NGCN 24 can act either as a regular UE or a "privileged sender".

The authorization policy must somehow be made available to the P-CSCF 18. The following options are possible ways of making the authorization policy available to the P-CSCF 18:
1. the authorization policy can be provided using a parameter in a P-Associated-Uniform Resource Identifier (P-Associated URI) header of a "2xx SIP response" response message to a "SIP REGISTER" request message, or the "2xx SIP response" to a "SIP SUBSCRIBE" request message (see further details below);
2. the authorization policy can be provided in a body of the "SIP REGISTER" response message (see further details below);
3. the authorization policy can be provided in the "SIP NOTIFY" message of the registration event package (see detailed description below); or
4. the P-CSCF can download the authorization policy, etc.

Each of the options mentioned above for providing the authorization policy from the home network to the P-CSCF 18 has its respective disadvantages.

The first option has the disadvantage that the parameter in the P-Associated-URI header of the signalling message "2xx SIP response" could become quite large as more policies become available in the future. Furthermore, if there are several P-Associated-URI headers with large parameters, the size of the SIP response to the SIP REGISTER request may become quite large, and if the SIP REGISTER request is sent using a User Datagram Protocol (UDP), the SIP response to the SIP REGISTER could become IP fragmented, since RFC3261 requires the same transport protocol for SIP response as used for the SIP request.

The second option also has similar problems to the first, i.e. the problem of IP fragmentation of the SIP responses.

The third option ensures that no SIP response IP fragmentation occurs. However, there is a time delay between reception of the SIP 2xx response to the SIP REGISTER request in the P-CSCF 18 and the reception of the SIP NOTIFY request with the authorization policy, as will be described in greater detail below.

The fourth option does not state what triggers a P-CSCF to download the policy, or where the P-CSCF would download the policy from. As such, the P-CSCF would have to try and download the policy on a consistent basis, which would result in too much unnecessary signalling.

FIG. 2, shows the basic steps in a registration flow by a NGCN 24, according to the third option described above.

The NGCN 24 begins a registration procedure by sending a SIP REGISTER request message 201 to a P-CSCF 18. Upon receipt of the SIP REGISTER request message 201, the P-CSCF 18 forwards the SIP REGISTER request towards the S-CSCF 12, shown as message 202. It will be appreciated by a person skilled in the art that, in practice, the forwarding of the SIP REGISTER request towards the S-CSCF 12 may involve the P-CSCF 18 forwarding the SIP REGISTER request towards an I-CSCF (not shown), which queries an HSS to check if the user is defined, in which case the I-CSCF selects the S-CSCF to which the SIP REGISTER request message is forwarded. In response to receiving the SIP REGISTER request message 202, the S-CSCF 12 responds by sending a SIP 2xx response message 203 to the P-CSCF 18.

Upon receipt by the P-CSCF 18 of the SIP response message 203, the P-CSCF 18 forwards the SIP response message 203 to the NGCN 24, shown as message 204, thereby indicating to the NGCN 24 that registration has been successful. The P-CSCF 18 shall also subscribe to a registered event package, shown as "SIP SUBSCRIBE request for registration event package" message 205.

When the P-CSCF 18 subscribes for the registration event package it expects to receive the following messages in response to the S-CSCF 12 accepting the subscription:
(a) a SIP 2xx response to SIP SUBSCRIBE request message 207, and
(b) a SIP NOTIFY request message 208.

Upon receipt of a SIP NOTIFY request message 208 the P-CSCF 18 will reply to the S-CSCF 12 with a "SIP 2xx response to SIP NOTIFY request", message 209.

As mentioned above, if the authorization policy for the NGCN 24 is provided in the SIP NOTIFY request message 208 then, until such time as the P-CSCF 18 receives the authorization policy, the P-CSCF 18 is unable to ensure correct authorization of any SIP requests received from an NGCN 24 (i.e. after the NGCN 24 has received the message 204). As such, there exists a period "t" from when an NGCN 24 receives a SIP 2xx response to SIP REGISTER request message 204, to when the P-CSCF 18 is able to accept further SIP requests from the NGCN 24.

In order to ensure correct policy enforcement, the P-CSCF 18 may:
(a) delay sending of the SIP 2xx response to the SIP REGISTER request message 204 towards the registered NGCN 24, or (b)
(b) reject any request received from the registered NGCN 24 requiring privileges until the SIP NOTIFY request message 208 with authorization is received.

These delays and rejected requests are disadvantageous, particularly for normal UEs and NGCNs 24 that do not have special privileges.

SUMMARY

It is an aim of the present invention to provide a method and node for a telecommunications network, which help alleviate one or more of the disadvantages mentioned above.

According to a first aspect of the invention, there is provided a method in a node of a telecommunications network. The method comprising the steps of: receiving a response to a register request message, the response containing a policy indicator relating to a user equipment making a register request; determining from the policy indicator whether the user equipment has an associated policy; and controlling the further operation of the node depending upon whether or not the user equipment is determined as having an associated policy.

The invention has the advantage of enabling UEs with associated policies to be handled in a predetermined manner, for example while the associated policy is being fetched. On the hand, any UEs not having associated policies can be handled in a normal manner without any delays or any rejected requests.

The step of controlling the further operation of the node may comprise the step of determining whether or not to delay sending a registration acceptance message to the user equipment. For example, the method may comprise the step of delaying the sending of a registration acceptance message to the user equipment if it is determined that the user equipment does have an associated policy.

This has the advantage of only delaying the sending of registration acceptance messages (i.e. while the policy is being fetched) to those UEs who have an associated policy that is to be fetched. The delay may correspond to the time taken to fetch the associated policy.

According to one embodiment the associated policy is fetched from a location identified by the response message. The location may be identified either explicitly or implicitly in the response message.

According to one embodiment the method may further comprise the steps of: receiving a further request message from an user equipment previously registered by the node; checking whether the user equipment was previously determined as having an associated policy; and controlling how the further request is handled based on the result of the checking step.

In such an embodiment, the handling of the further request may comprise the step of rejecting the further request message when the further request message requires an authorization, and it has previously been determined that the user equipment has an associated policy, and the associated policy has not yet been received.

In such an embodiment, the handling of the further request message may comprise the step of authorizing the further request message to be routed to another node if (a) it has been previously determined that the user equipment does not have an associated policy, or (b) it has previously been determined that the user equipment does have an associated policy, but the further request message does not require authorization.

According to another aspect of the invention, there is provided a method in a node of a telecommunications network, the node handling register requests from an user equipment. The method comprises the steps of: receiving a register request message from a second node; and returning a response to the register request message to the second node, wherein the response to the register request message contains a policy indicator, the policy indicator indicating whether the user equipment has an associated policy.

According to one embodiment, the policy indicator may be provided in a call-information header field of a Session Initiation Protocol (SIP) response message. According to an alternative embodiment, the policy indicator provides a reference to the policy using a message/external-body mechanism in the response message, and wherein the reference to where the content of the policy is stored is provided using an uniform resource identifier, URI. According to yet an alternative embodiment, the policy indicator may be provided in a new header or parameter of an existing header of a Session Initiation Protocol (SIP) response message.

According to another aspect of the invention, there is provided a node in a telecommunications network. The node comprises: a receiving unit for receiving messages; a sending unit for sending messages; and a processing unit adapted to perform the method as defined in the appended claims.

BRIEF DESCRIPTION OF THE DRAWINGS

For a better understanding of the present invention, and to show more clearly how it may be carried into effect, reference will now be made, by way of example only, to the following drawings in which.

DETAILED DESCRIPTION

The embodiments below will be described in relation to services associated with Next Generation Corporate Networks (NGCN), also known as Private Branch Exchange (PBX) or Enterprise Networks according to Release 8 of the 3$^{rd}$ Generation Partnership Project (3GPP), Technical Specification 24.229. It is noted, however, that the invention is intended to be used with other user equipment (UE) or other services which require a node such as a Proxy-Call Session Control Function (P-CSCF) node to be informed about an authorization policy associated with registered UEs.

Figure 1:
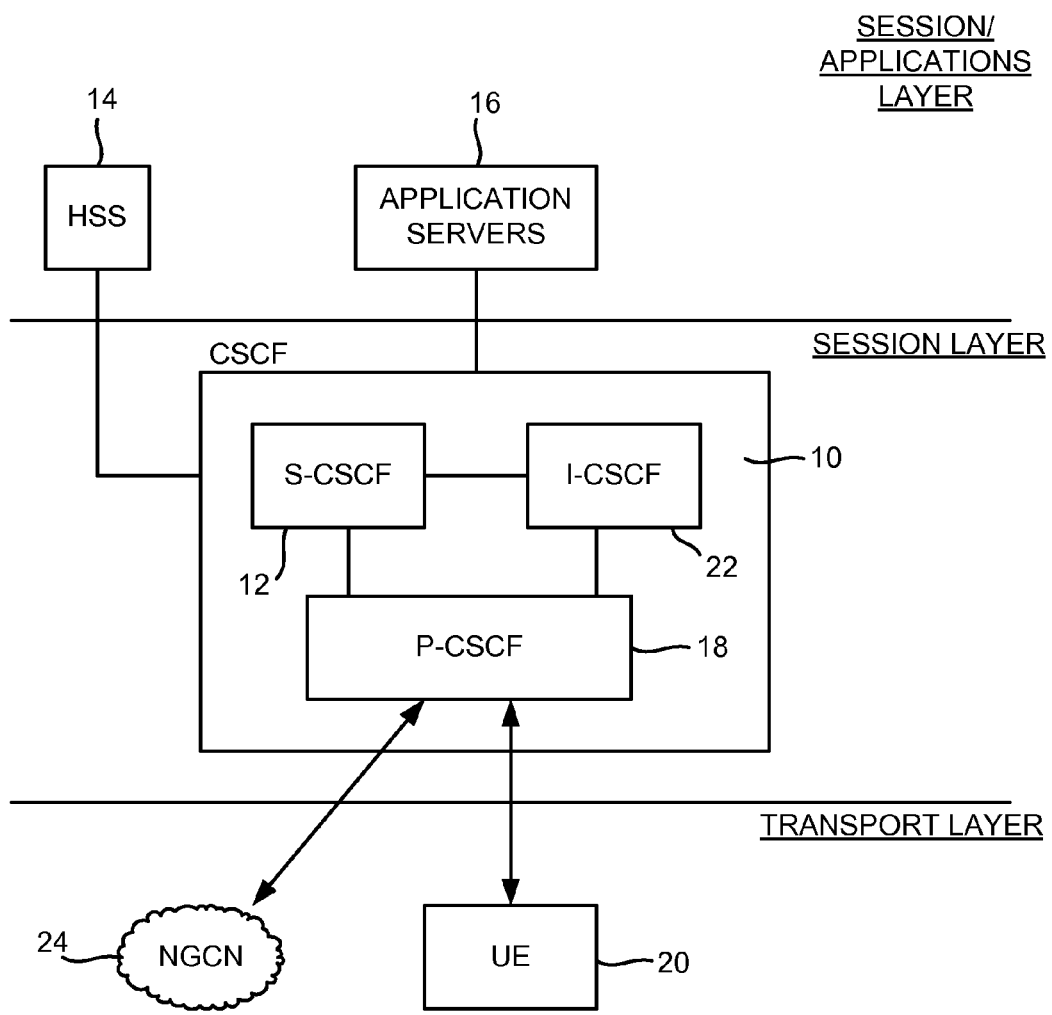
FIG. 1 shows some basic components of an IP Multimedia Subsystem (IMS)
Figure 2:
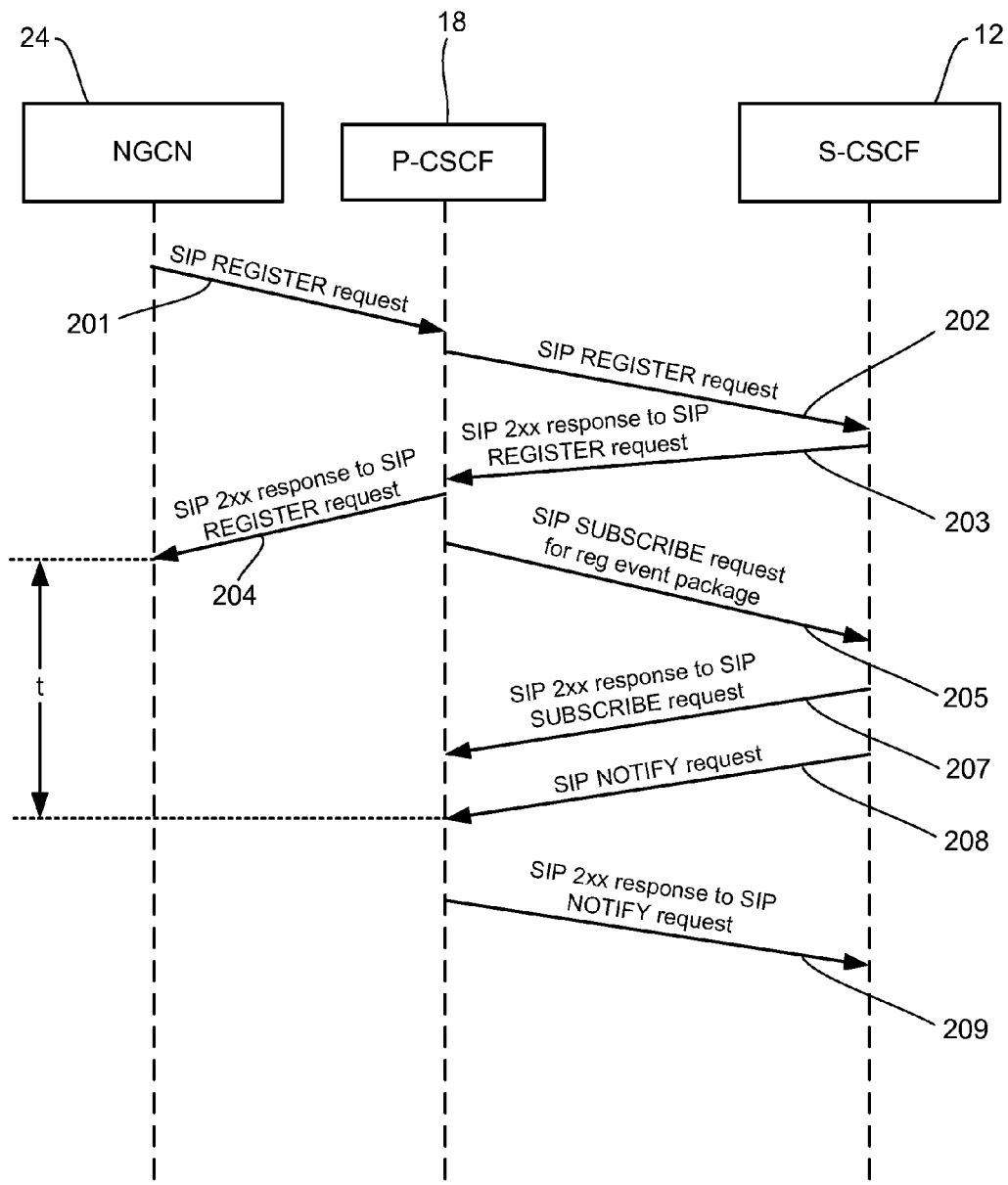
FIG. 2 shows a flow diagram of a registration flow in an IMS network.
Figure 3:
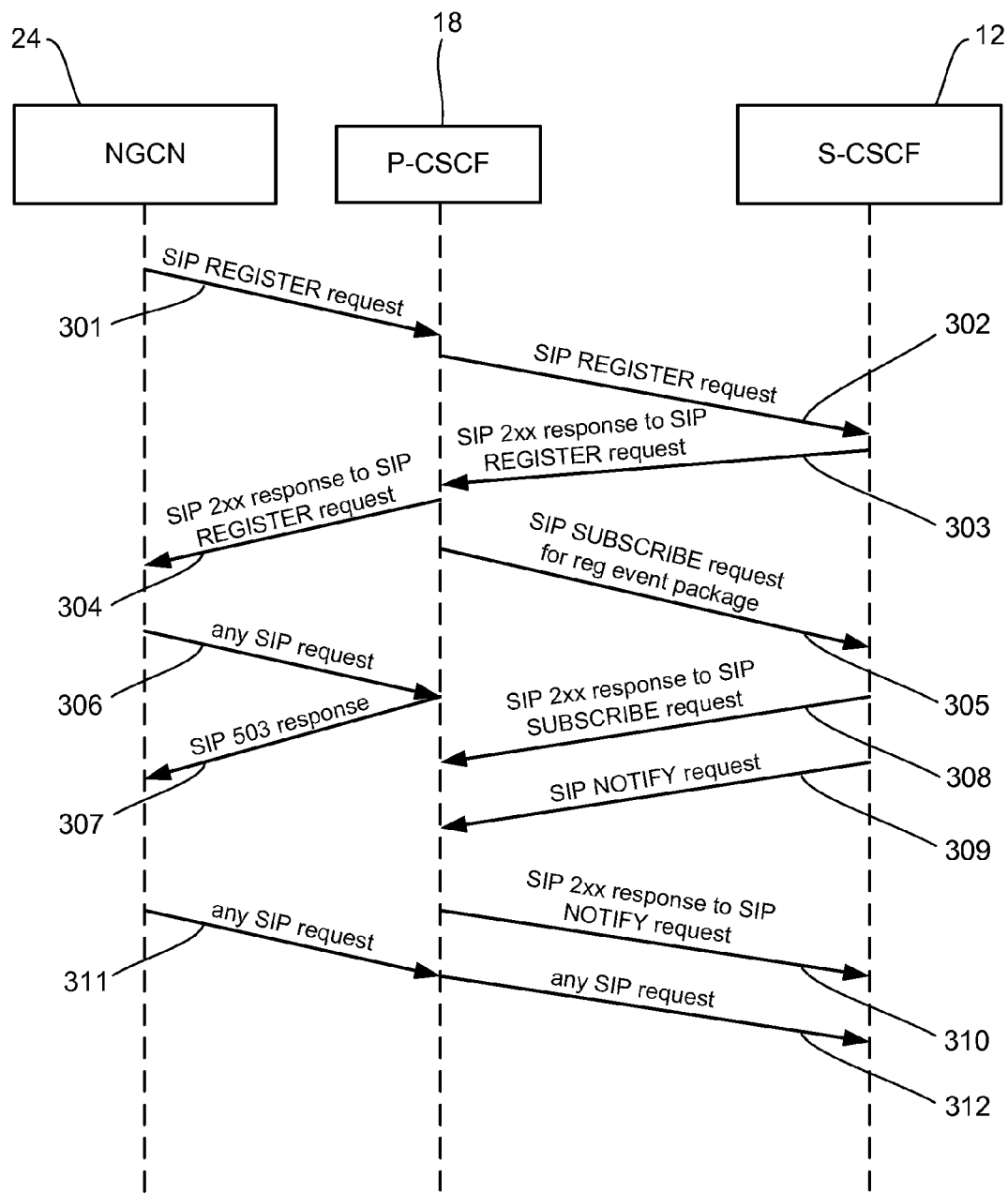
FIG. 3 shows a flow diagram of a registration procedure in accordance with a first aspect of the present invention.

FIG. 3 shows a method according to an embodiment of the present invention, and in particular a registration flow where an NGCN 24 is acting as a UE with additional privileges, i.e. a "privileged sender".

The NGCN 24 begins a registration procedure, for example for "bob@home1.net", by sending a SIP REGISTER request message 301 to a P-CSCF 18.

Upon receipt of the SIP REGISTER request message 301, the P-CSCF 18 forwards the SIP REGISTER request towards the S-CSCF 12, shown as message 302. As mentioned above, it will be appreciated by a person skilled in the art that, in practice, the forwarding of the SIP REGISTER request towards the S-CSCF 12 may involve the P-CSCF 18 forwarding the SIP REGISTER request towards an I-CSCF (not shown for purposes of clarity), which queries an HSS to check if the user is defined, in which case the I-CSCF selects the S-CSCF to which the SIP REGISTER request message is forwarded.

In response to receiving the SIP REGISTER request message 302, the S-CSCF 12 responds by sending a response message 303, for example a SIP 200 OK response message (e.g. SIP2xx response to SIP REGISTER request), to the P-CSCF 18. In accordance with the present invention, the response message 303 sent from the S-CSCF 12 to the P-CSCF 18 contains a policy indicator. The policy indicator provides an indication as to whether or not the NGCN 24 (i.e. UE) has an authorization policy defined or not, but without giving the actual authorization policy.

According to one embodiment the policy indicator may be provided as a flag, i.e. a flag indicating whether or not the UE has an authorization policy defined or not. Alternatively, the policy indicator may contain a resource identifier, for example an address value, the resource identifier indicating where the policy for the UE is stored. For example, the policy indicator may be provided as a Uniform Resource Identifier (URI) pointing to the storage of the policy information for that particular NGCN 24. Further details of the policy indicator are given later in the application.

It is noted that the policy information may contain information about other privileges associated with the NGCN 24. In other words, it is noted that the invention is not limited to NGCN related "privileged sender" privileges. For example, the policy information may contain a "private network traffic allowed indicator", as defined in 3GPP Technical Specifications 24.229-890, Release 5.2.1.

According to the invention, when the P-CSCF 18 receives the SIP response message 303 comprising the policy indicator, it determines whether the NGCN 24 has an associated policy. If it is determined that the NGCN 24 has an associated policy, then the P-CSCF 18 begins to fetch the policy. For example, the policy indicator may include a resource identifier or an address value indicating where the policy is held for that NGCN 24, such that the P-CSCF 18 can then start fetching the policy from that explicit location, i.e. based on the resource identifier or address value.

At this stage the P-CSCF 18 can store information which indicates that the particular NGCN 24 has an associated policy. This information, as will be described later, can be used to control how subsequent request messages from the registered NGCN 24 are handled by the P-CSCF 18.

Also, upon receipt by the P-CSCF 18 of the response message 303 (e.g. SIP 2xx response to SIP REGISTER request) mentioned above, the P-CSCF 18 may also forward the response message (i.e. SIP 2xx response to SIP REGISTER request) to the NGCN 24, shown as message 304, thereby indicating to the NGCN 24 that registration has been successful. The NGCN 24 can detect from the SIP response that specific policies apply. The P-CSCF 18 subscribes to the registration event package, shown as "SIP SUBSCRIBE request for registration event package" message 305.

When the P-CSCF 18 subscribes to the registration event package it expects to receive the following messages in response to the S-CSCF 12 accepting the subscription:

(a) a SIP 2xx response to SIP SUBSCRIBE request message 308, and
(b) a SIP NOTIFY request message 309.

The policy authorization information for the NGCN 24 may be provided in the SIP NOTIFY request message 309.

It is noted, however, that the policy information may be provided in other ways without departing from the scope of the invention. For example, it is noted that, based on the URI scheme of the policy URI, the P-CSCF 18 can use another mechanism to fetch the policy. For example, in the case of having a Hyper-Text-Transfer-Protocol Uniform Resource Locator (HTTP URL), the P-CSCF 18 may send a HTTP GET request in step 305, with the policy then being received in a HTTP 2xx response to the HTTP GET request in step 308.

Upon receiving the SIP 2xx response to the SIP REGISTER request, message 304, the NGCN 24 may decide to send a SIP request that needs authorizing by the policy, for example a SIP INVITE request constructed along the rules for a "privileged sender", as shown in step 306.

Since the SIP request in step 306 is constructed along the rules for the "privileged sender" (i.e. which is only allowed to UEs with special privilege), and since the P-CSCF 18 knows that the registered NGCN 24 has policy (i.e. from the information that was previously stored during the registration procedure), and since the P-CSCF 18 does not yet have the policy, the P-CSCF 18 does not know whether the request is an allowed request or not, and therefore can only reject the request, shown in step 307 as a "SIP 503 response message".

In other words, until the policy has been fetched by the P-CSCF 18, any requests which require a special privilege (for example a SIP request 306) which are received by the P-CSCF 18 from the registered NGCN 24 will be rejected, for example with a SIP 503 response 307.

However, if the P-CSCF 18 had previously received a response message 303 (i.e. SIP 2xx response to the SIP REGISTER request 302) in which the policy indicator indicated that the registered NGCN 24 does not have policy, the P-CSCF 18 would not apply any special handling, i.e. any request received from the NGCN 24 would be handled immediately in the normal manner. As such, if the SIP request in step 306 does not require any additional authorization, then the P-CSCF 18 would just forward or route the request to the S-CSCF 12 in the normal manner (not shown). It is noted that normal requests not requiring authorization will be forwarded in this way even if sent by an user equipment (NGCN 24) which has previously been determined as having a policy, and when that policy has not yet been received, i.e. because such a normal request does not rely on having the policy.

According to an alternative embodiment, instead of rejecting requests requiring an additional authorization, i.e. in step 307, the P-CSCF 18 could instead chose to delay the sending of the SIP 2xx response message to the SIP REGISTER request in the first place, i.e. delay step 304, when it is determined from the SIP response message 303 that the NGCN 24 has a policy that must be fetched.

To complete the procedure, step 310 shows how the P-CSCF 18 sends a SIP 2xx response to SIP NOTIFY request, thereby confirming that the P-CSCF 18 has received the NOTIFY request (which includes the registration event package).

In step 311 it is assumed that the NGCN 24 then decides to send a SIP request, for example a SIP INVITE request constructed along the rules for a "privileged sender". Since the P-CSCF 18 receives a request constructed along the rules for the "privileged sender" (which is only allowed to NGCNs with special privilege), and since the P-CSCF 18 knows that the registered MGCN 24 has policy (i.e. based on the determination made during the previous registration procedure for that UE in steps 301 to 303), and since the P-CSCF 18 has already received the policy, then the P-CSCF can authorize the request and, if acceptable, then forward the request in step 312 to the S-CSCF 12 for further handling.

It will therefore be appreciated that the invention has the advantage of providing consistent service to NGCNs having special privileges, while not affecting the P-CSCF behavior for NGCNs of regular UEs (i.e. those not having additional policy rules).

Further details will now be given of the SIP messages that may be used in the embodiment of FIG. 3, and how the SIP messages may be configured. It is noted that not all header fields are shown, and that the messages may differ from those illustrated below without departing from the scope of the invention.

The SIP REGISTER request message of step 301 from the NGCN 24 to the P-CSCF 18 may comprise the following header fields:
REGISTER sip:home1.net SIP/2.0
Via: SIP/2.0/UDP 1.2.3.4:5060;branch=z9hG4bKnashds7
Max-Forwards: 70
To: Bob <sip:bob@home1.net>
From Bob <sip:bob@home1.net>;tag=456248
Call-ID: 8438176376842230@998sdasdh09
CSeq: 1826 REGISTER
Contact: <1.2.3.4:5060>
Expires: 7200
Content-Length: 0

Parts of the header field shown above will be explained below:

The "Request-URI" names the domain of the location service for which the registration is meant (i.e. "sip:home1.net" in the example provided). The "username" and "@" components of the SIP-URI are not present in this part of the header field.

The "To" part of the header field contains the address-of-record whose registration is to be created, queried or modified. The "to" header field and the Request-URI header field typically differ, as the former contains the username (i.e. bob@home1.net in the example provided).

The "From" header field contains the address-of-record of the person responsible for the registration. The value is the same as the "To" header field unless the request is a third-party registration.

The "Call-ID" uniquely identifies a particular invitation or all registrations of a particular client.

The "CSeq" value guarantees proper ordering of REGISTER requests. A UE must increment the CSeq value by one for each REGISTER request with the same Call-ID.

A "Contact" header field may contain zero or more values containing address bindings.

The SIP REGISTER request message of step 302 from the P-CSCF 18 to the S-CSCF 12 may comprise the following header fields:
REGISTER sip:registrar.home1.net SIP/2.0
Via: SIP/2.0/UDP p-cscf.visited1.net:5060; branch=fghgfh
Max-Forwards: 70
To: Bob <sip:bob@home1.net>
From Bob <sip:bob@home1.net>;tag=456248
Call-ID: 8438176376842230@998sdasdh09
CSeq: 1826 REGISTER
Contact: <sip:1.2.3.4:5060>
Expires: 7200
Content-Length: 0

The SIP 200 OK response message 303 from the S-CSCF 12 to the P-CSCF 18 may comprise the following header fields:
SIP/2.0 200 OK
Via: SIP/2.0/UDP p-cscf.visited1.net:5060; branch=fghgfh; received=2.3.4.5
Via: SIP/2.0/UDP 1.2.3.4:5060;branch=z9hG4bKnashds7
Max-Forwards: 70
To: Bob <sip:bob@home1.net>; tag=2493k59kd
From Bob <sip:bob@home1.net>;tag=456248
Call-ID: 8438176376842230@998sdasdh09
CSeq: 1826 REGISTER
Contact: <sip:1.2.3.4:5060>
Expires: 7200
Content-Length: 0

Call-info: <sip:bob@home1.namethod=SUBSCRIBE?Event=reg>; purpose=policy

Thus, the message shown above provides the policy indicator in the "Call-Info" header field, with the Call-Info header field containing a URI indicating where to retrieve the policy. In particular, in the example above the policy can be fetched by subscription to a registered event package, which is sent towards sip:bob@home1.net.

Alternatively, the Call-info header field may contain a URI with a different Event parameter value (for example, sip:bob@home1.namethod=SUBSCRIBE?Event=ua-profile). As a further alternative the Call-Info heard field may contain some other form or URI scheme, such as HTTP URI.

As mentioned earlier in the application, another method of indicating that the NGCN has policy is to include a body of Content-Type, such as a message/external-body with the URL parameter indicating where to retrieve the policy (for example according to Request For Comment (RFC) 4483). These are extensions to Uniform Resource Locator (URL) Multipurpose Internet Mail Extensions (MIMEs), wherein the extensions allow any MIME part in a SIP message to be referred to indirectly via an Uniform Resource Identifier (URI). In such an embodiment, the policy indicator provides a reference to the policy using a message/external-body mechanism in the response message, wherein the reference to where the content of the policy is stored is provided using an URI.

For example:
SIP/2.0 200 OK
Via: SIP/2.0/UDP p-cscf.visited1.net:5060; branch=fghgfh; received=2.3.4.5
Via: SIP/2.0/UDP 1.2.3.4:5060;branch=z9hG4bKnashds7
Max-Forwards: 70
To: Bob <sip:bob@home1.net>; tag=2493k59kd
From Bob <sip:bob@home1.net>;tag=456248
Call-ID: 8438176376842230@998sdasdh09
CSeq: 1826 REGISTER
Contact: <sip:1.2.3.4:5060>
Expires: 7200
Content-Length: 0
Content-Type: message/external-body;access-type="URL";
URL="sip:bob@biloxi.com; method=SUBSCRIBE?Event=reg"

Yet another alternative for providing the policy indicator is to insert a newly defined SIP header into the SIP 200 response to the SIP REGISTER request. The newly defined header may contain the policy URI or a flag indicating that the NGCN 24 has a policy.

It is noted that the messages sent in steps 304 to 308 may comprise standard header fields.

With regard to the SIP NOTIFY request sent in step 309, the following is an example of a possible implementation. It is noted, however, that the SIP NOTIFY request 309 may vary from the example provided, without departing form the scope of the invention.

NOTIFY p-cscf.visited1.net:5060 SIP/2.0
. . .
Content-Type: application/reginfo+xml
Content-Length: . . .

<?xml version="1.0"?>
<reginfo xmlns="urn:ietf:params:xml:ns:reginfo" version="1" state="partial" Xmlns:ABCDEF="URN@3gpp:ns:SomeName:SomeSubName">

-continued

```
<registration aor="sip:joe@example.com" id="a7" state="active">
  <contact id="76" state=active" event="registerd"
      duration-registered="0">
    <uri>sip:joe@pc34.example.com</uri>
  </contact>
  <ABCDEF:confParam>the policy</ABCDEF:confParam>
</registration>
</reginfo>
```

The invention has the advantage of providing the policy information in a two-stage process. First, a policy indicator in the form of a flag or address value is given to indicate that the UE (NGCN) has a policy, and then the policy itself is fetched at a later stage. The initial flag enables UEs with special privileges to be handled in a predetermined manner, while the policy is being fetched. In the meantime, any UEs not having special privileges are handled in a normal manner without any delays or any rejected requests.

Figure 4:
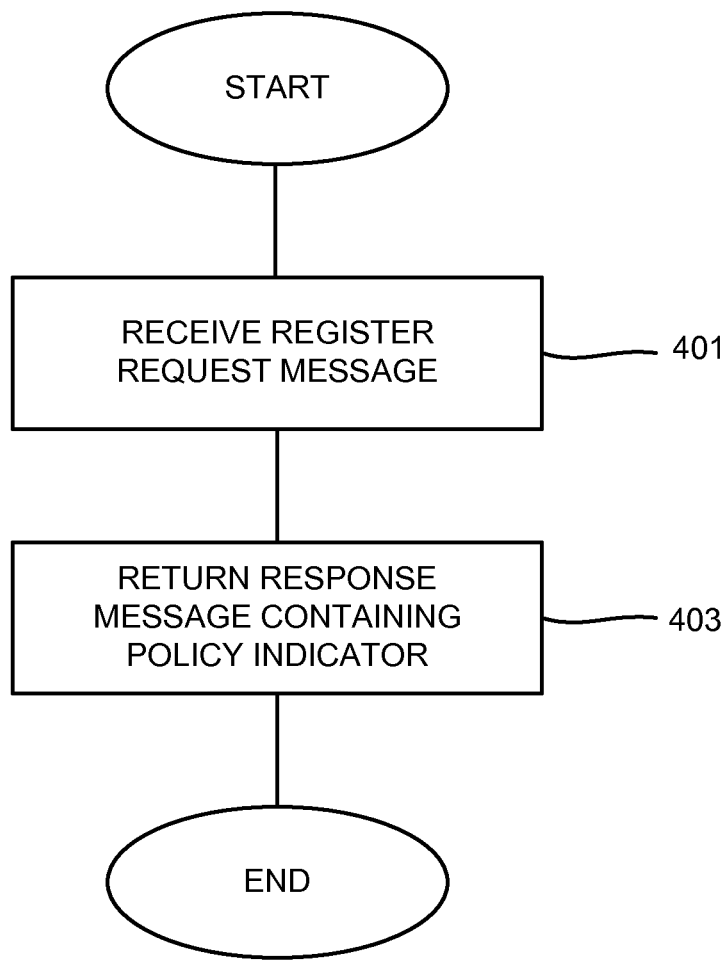
FIG. 4 shows the steps performed at a node of an IMS network, for example an S-CSCF node of an IMS network.

FIG. 4 describes the steps that may be performed at a node such as the S-CSCF 12 in the embodiments described above. In response to receiving a register request message, step 401, the node is adapted to return a response message, wherein the response message contains a policy indicator, step 403. The policy indicator indicates whether the UE making the register request has special privileges or an authorization policy.

Figure 5:
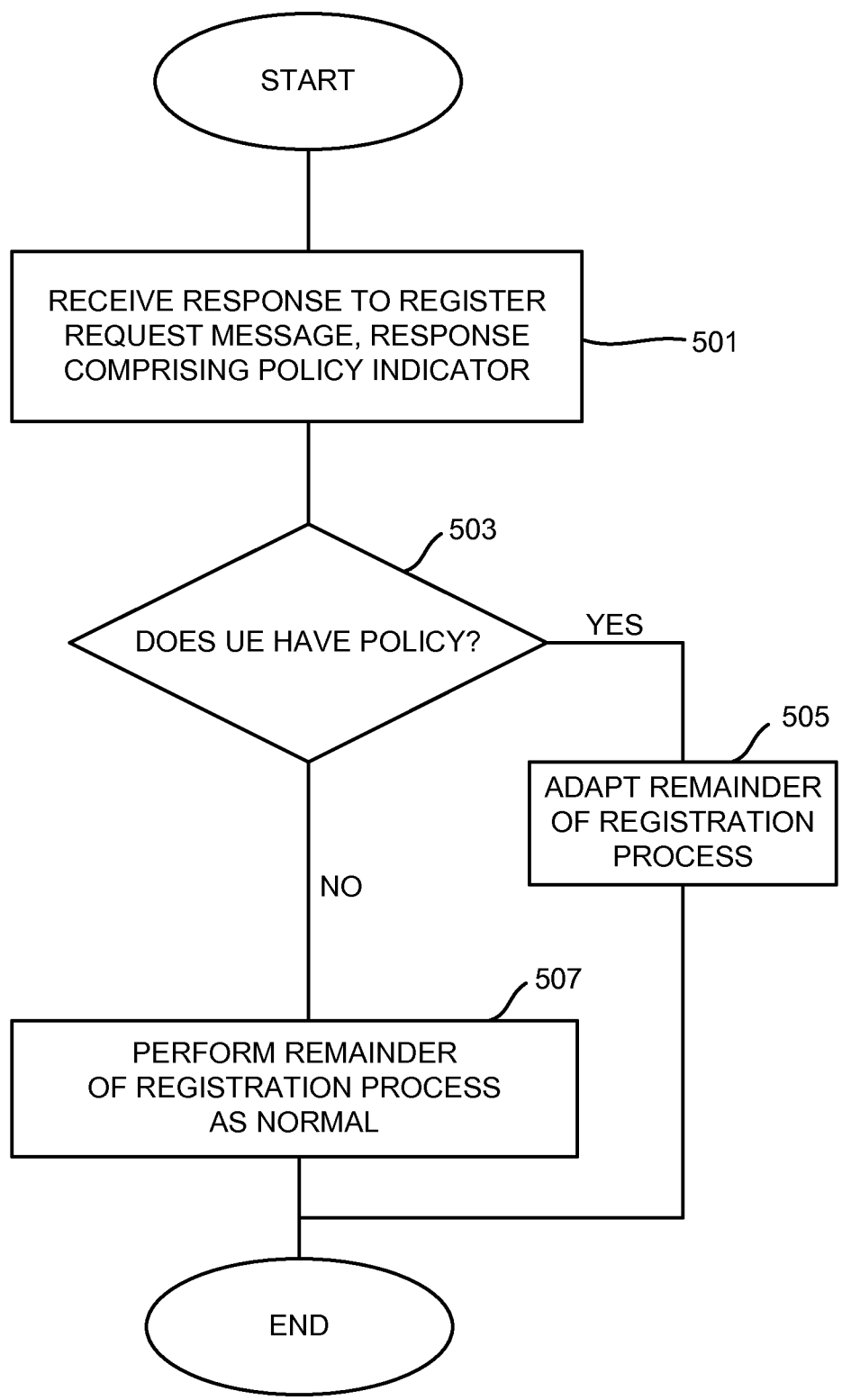
FIG. 5 shows the steps performed at another node of an IMS network, for example a P-CSCF node of an IMS network.

FIG. 5 describes the steps that may be performed at a node such as a P-CSCF 18 in the embodiments described above. In step 501 the P-CSCF 18 receives a response to a register request message, comprising a policy indicator as described in the embodiments above. In step 503 it is determined whether the user equipment making the register request has an associated policy. If the user equipment does not have an associated policy, the remainder of the registration process is performed as normal, step 507. For example, the response message received by the P-CSCF 18 is forwarded to the user equipment, thereby indicating to the user equipment that registration has been successful.

However, if it is determined in step 503 that the UE does have an associated policy, then in step 505 the remainder of the registration process is adapted in some way. For example, this may comprise the step of delaying the forwarding of the response message to the user equipment. The delay may correspond to the time it is expected to take to fetch the policy information from a location indicated in the response message received by the P-CSCF 18 from the S-CSCF 12.

Figure 6:
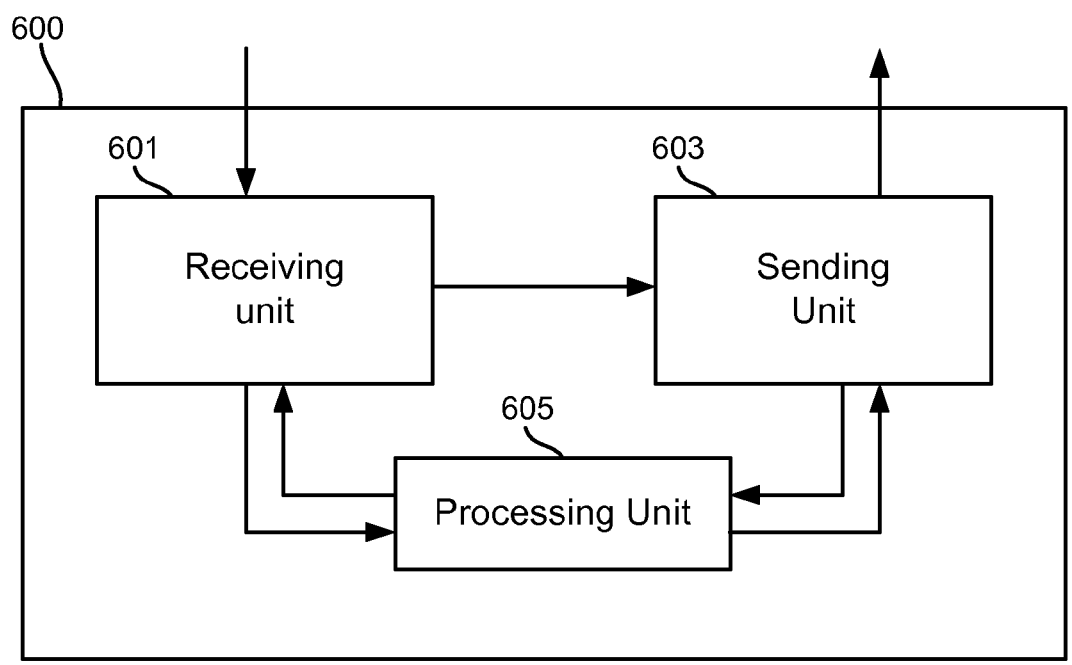
FIG. 6 shows a node according to an embodiment of the present invention.

FIG. 6 shows a node 600 according to an embodiment of the present invention. The node 600 comprises a receiving unit 601 for receiving messages from another node, and a sending unit 603 for sending messages to another node. The node also comprises a processing unit 605, for processing messages received and/or sent to another node.

For example, in one embodiment the node 600 may comprise a proxy call session control function (P-CSCF) node. In which case the receiving unit 601 may be adapted to receiving a response message (such as a SIP 2xx response message) to a register request message (such as a SIP REGISTER request message). The response message contains a policy indicator relating to an UE making the register request. The processing unit 605 is adapted to determine from the policy indicator whether the UE has an associated policy. If the processing unit 605 determines that the UE has an associated policy, the processing unit 605 is configured to control the further operation of the node 600 depending upon whether or not the UE is determined as having an associated policy. For example, the processing unit 605 may delay sending registration acceptance messages via the sending unit 603 to the UE.

The processing unit 605 may also be configured to reject further request messages received from a registered UE, if it has previously been determined that the UE has a policy, and that policy has not yet been received.

The processing unit 605 may also be configured to authorize further request messages received from a registered UE, if it has previously been determined that the UE does not have policy.

The processing unit 605 may comprise a store for storing information relating to the policy indicator, the stored information being used during subsequent message handling by the node.

According to another embodiment the node 600 may comprise a serving call session control function (S-CSCF) node. In which case the receiving unit 601 may be adapted to receive a register request message from a second node (for example a SIP REGISTER request form a P-CSCF). The processing unit 605 is adapted to include a policy indicator in a response message (for example a SIP 2xx response message to a SIP REGISTER request) being sent via the sending unit 603 to the second node. The policy indicator indicates to the second node whether the UE making a register request has an associated policy.

Although the invention has been described in relation to providing policy indication to a P-CSCF, it is noted that the invention may also be applied to other instances where a policy indication needs to be provided to another node.

It is also noted that although the policy indicator has been described as providing an indication as to whether or not the UE has a policy or not, the policy indicator may also comprise information relating to at least part of the actual authorization policy itself.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a Proxy Call Session Control Function (P-CSCF) node of a telecommunications network, the method comprising:
   receiving from a Serving Call Session Control Function (S-CSCF) node of the telecommunications network a response to a register request message, the response containing a policy indicator relating to a user equipment making a register request, wherein the policy indicator provides an indication as to whether the user equipment has an authorization policy associated therewith;
   determining from the policy indicator whether the user equipment has an associated authorization policy;
   determining whether to delay sending a registration acceptance message to the user equipment depending on whether the user equipment has an associated authorization policy; and
   controlling a further operation of the P-CSCF node depending upon whether or not the user equipment is determined as having an associated authorization policy, wherein controlling the further operation of the P-CSCF node comprises:
   if it is determined that the user equipment has an associated authorization policy, fetching the associated authorization policy for a location identified by the response; and
   if the user equipment has an associated authorization policy, delaying sending the registration acceptance message to the user equipment.

2. The method as claimed in claim 1, wherein the location is identified either explicitly or implicitly in the response message.

3. The method as claimed in claim 1, wherein the delay corresponds to the time taken to fetch the associated authorization policy.

4. The method as claimed in claim 1, further comprising:
   receiving a further request message from the user equipment previously registered by the P-CSCF node;
   checking whether the user equipment was previously determined as having an associated authorization policy; and
   controlling how the further request is handled based on the result of the checking step.

5. The method as claimed in claim 4, further comprising rejecting the further request message when the further request message requires an authorization, and it has previously been determined that the user equipment has the associated authorization policy, and the associated authorization policy has not yet been received.

6. The method as claimed in claim 4, further comprising authorizing the further request message to be routed to another node when at least one of the following has occurred:
   (a) when previously determined that the user equipment does not have an associated authorization policy, and
   (b) when previously determined that the user equipment does have an associated authorization policy, but the further request message does not require authorization.

7. A Proxy Call Session Control Function (P-CSCF) node in a telecommunications network, the node comprising:
   a receiving circuit for receiving messages;
   a sending circuit for sending messages; and
   a processing circuit adapted to:
   receive from a Serving Call Session Control Function (S-CSCF) node of the telecommunications network a response to a register request message, the response containing a policy indicator relating to a user equipment making a register request, wherein the policy indicator provides an indication as to whether the user equipment has an authorization policy associated therewith;
   determine from the policy indicator whether the user equipment has an associated authorization policy;
   determine whether to delay sending a registration acceptance message to the user equipment depending on whether the user equipment has an associated authorization policy; and
   control a further operation of the node depending upon whether the user equipment is determined as having an associated authorization policy, wherein controlling the further operation of the P-CSCF node comprises:
   if it is determined that the user equipment has an associated authorization policy, fetching the associated authorization policy from a location identified by the response; and
   if it is determined that the user equipment has an associated authorization policy, delaying sending the registration acceptance message to the user equipment.

* * * * *